Nov. 16, 1948.　　　W. R. GARDINER ET AL　　　2,453,900
FILM DEVELOPING APPARATUS
Filed March 18, 1946　　　3 Sheets-Sheet 3
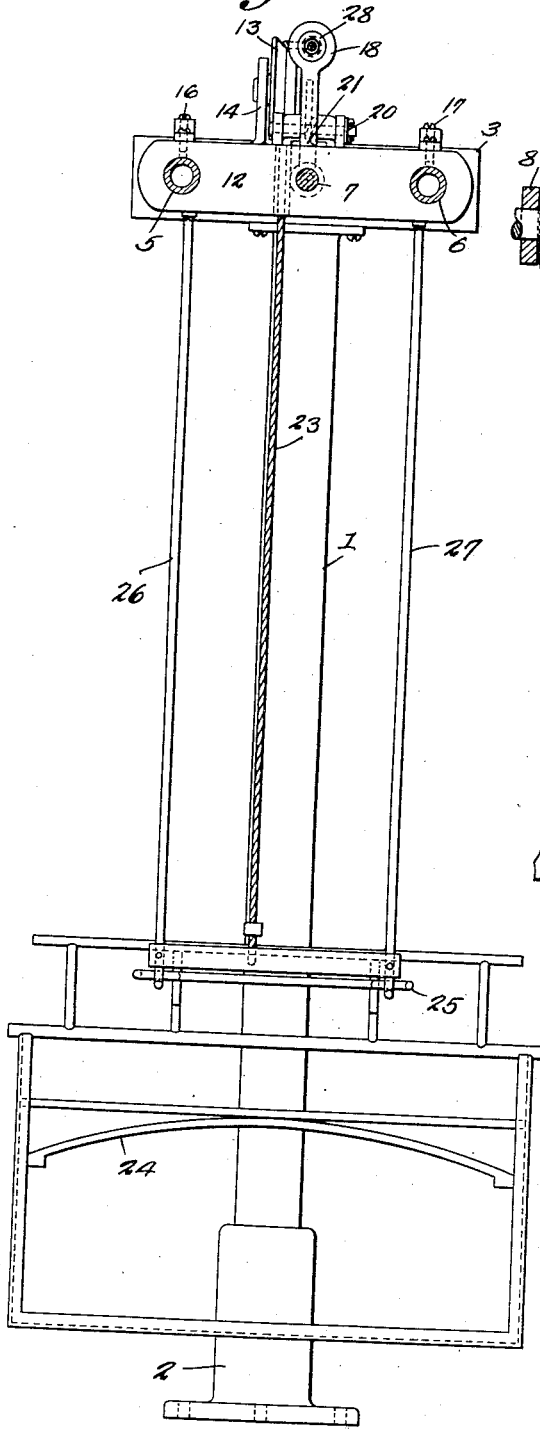
Fig. 3.
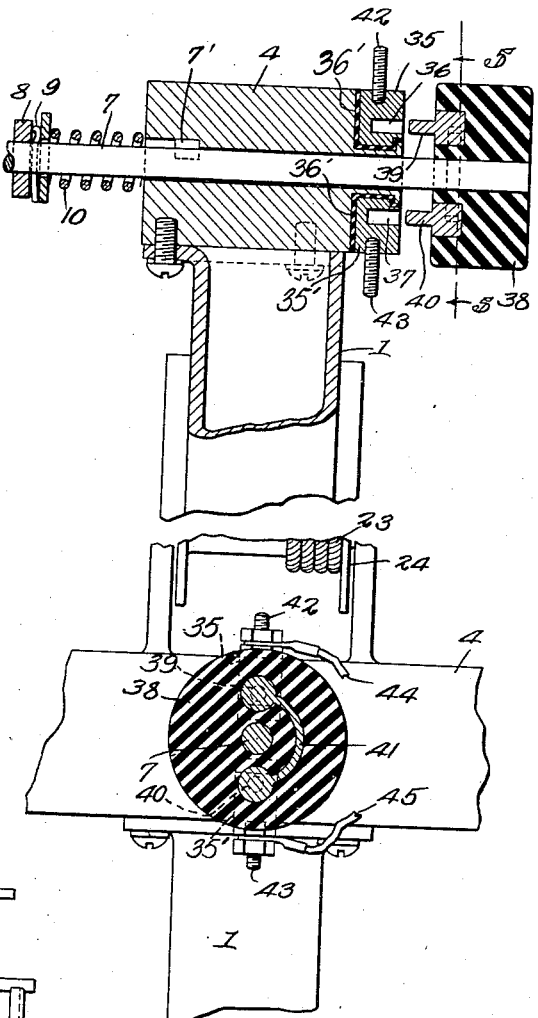
Fig. 4.
Fig. 5.
W. R. Gardiner
J. T. Mays
INVENTORS.
BY
ATTORNEYS.

Patented Nov. 16, 1948

2,453,900

UNITED STATES PATENT OFFICE 2,453,900

FILM DEVELOPING APPARATUS

William R. Gardiner and John T. Mays, Herrin, Ill.

Application March 18, 1946, Serial No. 655,219

6 Claims. (Cl. 95—89)

Our present invention relates to an improved film developing apparatus and more particularly to a completely automatic device for removing film in the process of development from the respective tanks for developing, stopping, and fixing at the proper time intervals.

As illustrated in the drawings we have shown our invention as applicable to photographic plates such as those used in X-ray photography but it will be apparent that the structure is equally adapted to other types of photography and other types of film.

Photographically, there are three essential steps in the development of an exposed film, all of the steps being carried out in a dark room, or in a cabinet or other suitable lightproof structure.

The first step is the immersion of the exposed film in the developing solution for a predetermined period of time. Secondly, the film is removed from the developing solution and immersed in a bath to stop development as an acid bath. Thirdly, the film is immersed in a fixing solution to permanently maintain the film so developed in the condition in which it was removed from the developer.

Our invention contemplates an automatic machine for removing the film from the developer, carrying over and immersing it in the stop bath, removing the film from the stop bath, and carrying it over and immersing it in the fixing solution. The time of fixing is not critical except as to the minimum, and the film may be left in the fixing solution for a substantial period of time beyond the minimum for fixing without ill effects.

We therefore provide for the movement of the film from the developer through the stop and through the fixing solution in critical adjusted times.

When used according to our invention the device may be started by the operator, and left, whereupon the film will follow the prescribed course and will be ready in the fixing solution when the operator returns.

In the accompanying drawings we have illustrated one complete example of the physical embodiment of our invention according to the best mode we have thus far devised but it will be understood that various changes and alterations may be made within the scope of the appended claims.

In the drawings:

Figure 3 is a transverse sectional view of the apparatus taken along line 3—3 of Figure 2.

Figure 4 is an enlarged sectional view of the circuit breaker; and

Figure 5 is a transverse sectional view of the circuit breaker taken along line 5—5 of Figure 4.

Figure 1:
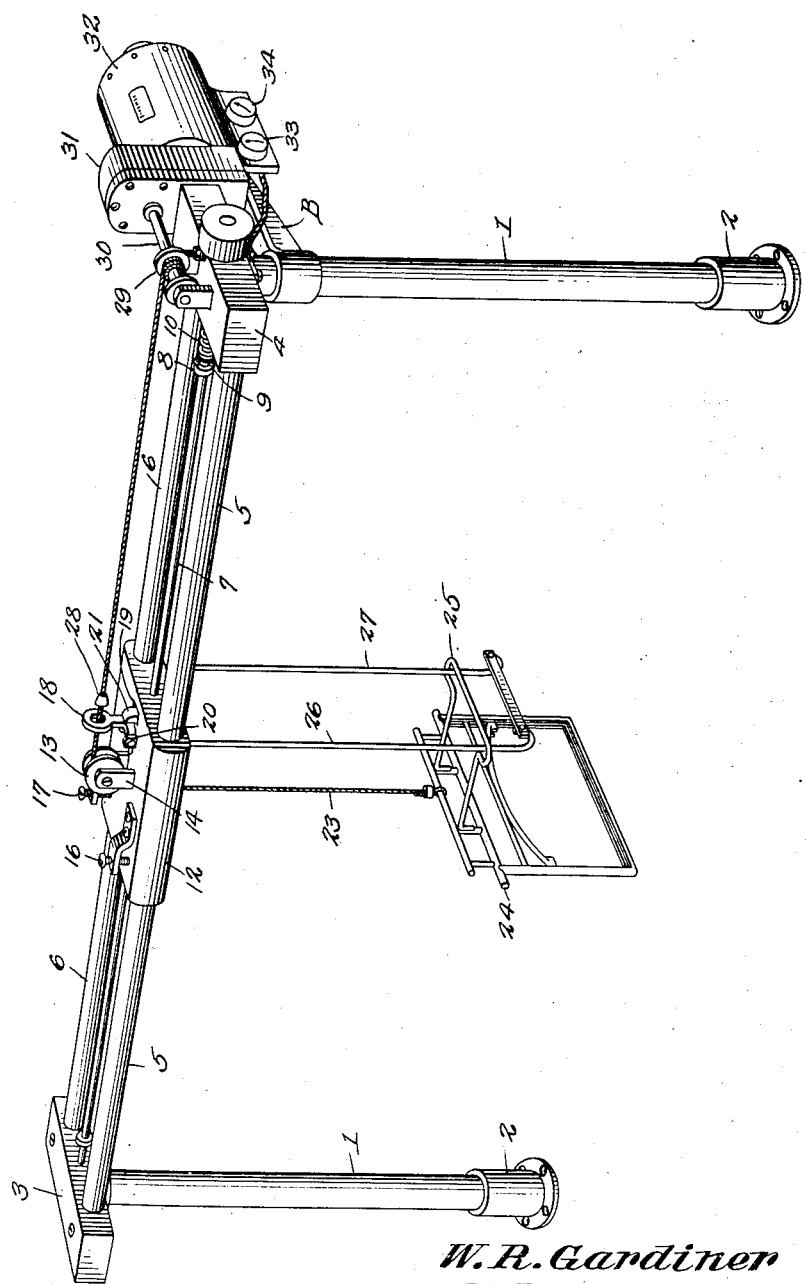
Figure 1 is a perspective view of the apparatus of our invention.

Referring now to the drawings, our invention contemplates the use of vertical supports 1 shown as tubular in structure although any suitable form may be used. The supports are formed with lower flanged collars 2 by means of which the supports may be affixed to the floor if desired.

Secured upon the upper ends of the supports 1 are the end frames 3 and 4, and between these end frames we employ guide rods 5 and 6. These guide rods are cylindrical and smooth, and are suitably affixed to the end frames.

Between and equidistant from the guide rods 5 and 6 we utilize a trip rod 7 which has its ends slidably mounted in the end frames, but which is keyed against rotation in the end frames 4 by key 7'. Thus, the trip rod is slidable in either direction relative to the end frames but is not rotatable. Near the end frame 4 and on the rod 7 we use a collar 8 and a cotter pin 9 to hold the rod 7 against the pressure of the coil spring 10. The spring 10 is compressed between the collar and the end frame and urges the rod to the left in Figures 1 and 2. When the rod has been moved to the left, as described, it is in its normal position, this position being that shown in Figure 2. A circumferential notch 11 is shown substantially midway between the end frames 3 and 4.

The carriage 12 is slidably mounted upon the guide rods 5 and 6 and is also adapted to pass along the trip rod 7. Upon the carriage 12 is mounted a sheave or pulley 13 as by support 14 and a vertical opening 15 is provided in the carriage for communication therethrough.

Adjustment screws 16 and 17 are shown upon the upper surface of the carriage. These are threadable against the respective guide rods 5 and 6, for the purpose of adjustably increasing or decreasing, as desired, the frictional engagement between the carriage and the guide rods. Obviously, some type of suitable friction-producing material may be interposed between the ends of the adjusting screws and the surfaces of the guide rods, or alternatively, the screws can be threaded directly against said surfaces. A trip lever 18 is mounted above the opening 19 in the carriage above the trip rod 7 and the lever is pivotally secured upon the carriage as at 20. A dog 21 attached to the lever extends through the opening 19 resting upon the trip rod and urged thereagainst by spring 22.

Adapted to ride upon the sheave or pulley 13 we employ a cable 23 to which is attached at the depending end, the film carrier 24. This carrier is shown as fashioned of wire and is adapted to support film when immersed. The carrier is provided with a guide frame 25 formed to ride vertically upon the vertical guide rods 26 and 27. These guide rods are suitably attached to the carriage 12.

Upon the cable 23 we have fashioned the cable stop 28 adapted for co-action with the trip lever 18. The cable after passing over the sheave and through the lever is secured upon the winding reel 29 mounted upon the end frame 4 and carried by the axle 30. The axle is operably connected to the set of reduction gears 31, which in turn is operably connected to the motor 32 supported upon the bracket B.

Timing switches of conventional character are shown at 33 and 34 to control the time of the steps of the operations.

A circuit breaker is shown mounted upon the end of the trip rod 7 and comprises the female contact elements 35 and 35' having sockets 36 and 37. The female elements of the circuit breaker are suitably attached to the end frame 4 and are insulated therefrom as at 36'. The second movable element of the circuit breaker 38 is fixedly secured to the trip rod 7 and is fashioned with male contact elements 39 and 40 for co-action with the female elements 36 and 37. Contact is broken when the trip rod is moved to the right in Figures 1, 2, and 4, out of the normal position of the trip rod hereinbefore described.

The male contacts 39 and 40 are electrically connected by the connection 41 therebetween.

Connector screws 42 and 43 are attached to the fixed portion 35 of the circuit breaker, and wires 44 and 45 respectively connected to the connectors lead to the switches and to the motor.

Figure 2:
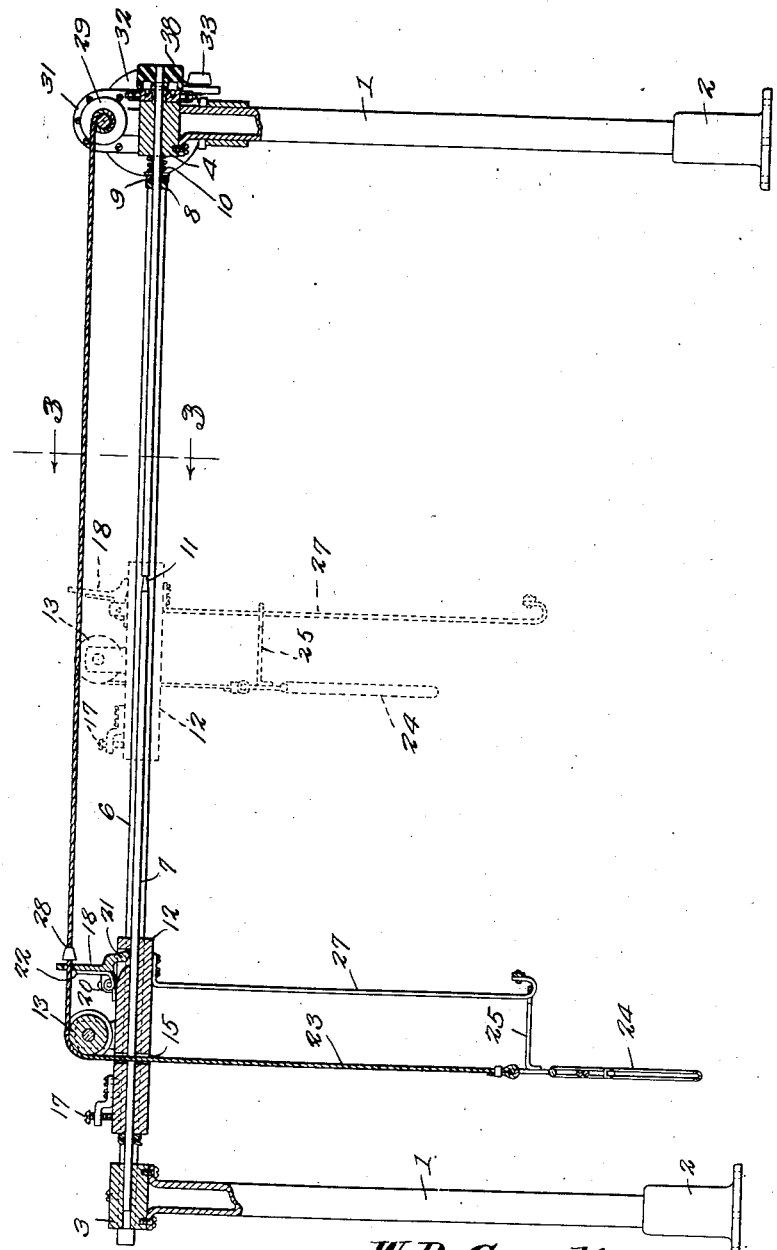
Figure 2 is a side elevational view thereof partially in section, the dotted lines indicating one of the positions taken by a carriage and film carrier.

In operation, with the carriage at the left extremity in Figures 1 and 2, the film to be developed is placed in the carrier and the carrier is immersed in the developing solution. The switches and timing elements are set for the proper time, and the motor is ready to start. When the proper time has elapsed, the motor cuts in reeling the cable thereon and elevating the film carrier and the film out of the developing solution.

When the carrier reaches its vertical limit, the motor continues to operate, and the carriage being slidably mounted on the guide rods, begins to move to the right. The dog 21 being urged against the trip rod rides thereon until the notch 11 is reached whereupon the trip rod is moved to the right breaking the circuit by moving the breaker element 38 out of contact with element 35. It should be here noted that the adjusting screws 16 and 17 will have previously been threaded against the guide rods 5 and 6 before the machine is operated, so as to provide a certain amount of friction between the guide rods and the carriage, whereby the carriage will not tend to be capable of movement except by pull of the motor. As a result of this frictional engagement, to which is added the weight of the carriage 12 itself, the tendency of the spring 10 to return the trip rod 7 to the left, to its normal position, is overcome, the dog 21 remaining in the notch 11 and holding the trip rod in the position to which it has been moved, to the right. The motor stops, and the weight of the film carrier unwinds the reel, the gears being rotated in a reverse direction by the reel, allowing the film carrier and the film to be immersed in the tank of stop solution thereunder. As the carrier reaches its lowest position, the cable stop 28 engages the trip lever 18, moving the dog 21 out of engagement with the notch 11, with the result that the trip rod 7 immediately moves to the left, back to normal position, bringing breaker element 38 again into contact with element 35, and closing the circuit breaker. At the predetermined time, the motor again operates elevating the carrier out of the stop bath, and the cycle of elevation and travel is repeated.

The carrier is elevated to the upper extent of its permitted movement, and then the carriage is moved to the right until the carriage strikes the collar 8 on the trip rod to again break the circuit. It is pointed out that as the carriage again begins to move to the right, there is no possibility of the dog 21 becoming engaged again with notch 11, since the notch 11 will be positioned to the left of the dog 21 at the time the carriage begins to move to the right.

Gravity again lowers the film carrier, this time into a fixing bath therebeneath. As stated above the time of fixing is not critical and therefore the apparatus need not remove the film from the fixing solution.

When the proper time has elapsed the operator may return and remove the film from the fixing bath, and complete the developing operation which includes washing or rinsing the film to remove the fixing solution, and then drying the film.

From the above description it should be apparent that we have developed an operating and efficient means for timing and removing film to be developed from the baths to which the film must be subjected. After once starting the operation by placing the film in the carrier in the developing solution and setting the timing switches, the operation is completely automatic and requires no further attention.

Having thus fully described our invention, what we claim as new and desire to secure by Letters Patent is:

1. A film developing apparatus for use with a plurality of developing solutions comprising opposed end frames, guide rods extending therebetween, a carriage slidable on the guide rods, a trip rod having its ends slidably mounted in the end frames, means tending to retain the trip rod in normal position, a trip lever on the carriage engageable with the trip rod, whereby to move the trip rod out of normal position, a circuit-breaking means carried by the trip rod adapted to open an electric circuit when the trip rod is moved out of normal position, a sheave on the carriage, a cable passing over the sheave, a film carrier on one end of the cable and below the carriage, a winding reel on one of the end frames connected to the other end of the cable, a stop on the cable engageable with the trip lever for disengagement thereof from the trip rod when the carrier is lowered, electrically controlled power means for rotating the reel, and timing switches on one of the end frames, said timing switches, circuit-breaking means, and power means being connected in circuit.

2. A film developing apparatus for use with a plurality of developing solutions, comprising opposed end frames, parallel guide rods extending therebetween, a trip rod extending between the end frames in parallel relation to the guide rods, the ends of the trip rod being slidably mounted in the end frames, a carriage slidable on the guide rods and on the trip rod, a sheave mounted on the carriage, a cable passing over the sheave and through the carriage, a film carrier on one end of the cable, electrically controlled winding means on one of the end frames connected to the other end of the cable, a circuit breaker in circuit with said electrically controlled winding means, carried by the trip rod, means on the carriage for engaging the trip rod, whereby to move it into circuit opening position, a stop on the cable engageable with said last-named means for disengagement thereof from the trip rod on downward movement of the film carrier, and means tending to normally retain the trip rod in circuit-closing position.

3. A film developing apparatus for use with a purality of developing solutions, comprising opposed end frames, a carriage mounted for slidable movement therebetween, a slidable trip rod extending between the end frames, a circuit breaker element on the trip rod, means on the carriage proportioned to engage the trip rod at a designated point, for movement thereof into circuit opening position, means tending to return the trip rod to normal circuit closing position, a film carrier dependingly supported by the carriage, a cable connected at one end to the film carrier and passing through the carriage, a stop on the cable for disengaging said first-named means on lowering of the carrier to a predetermined level, a winding reel on one of the end frames connected to the other end of the cable, whereby to raise the film carrier and to move the carriage after the carrier has been engaged by the carriage, and power means for rotating the reel, said power means being connected in circuit to the circuit breaking element.

4. A film developing apparatus for use with a plurality of developing solutions, comprising opposed end frames, a carriage mounted for horizontal movement therebetween, a film carrier, an electrically powered winding reel on one of the end frames, a cable connected at its respective ends to the reel and to the carrier, the cable being passed through the carriage intermediate its ends and supporting the carrier below the carriage, whereby in sequence to raise the carrier into engagement with the carriage and move the carriage and carrier horizontally, a trip rod, including a circuit-breaking element in circuit with the power means, mounted for movement into circuit-closing and circuit-opening position, interengaging means between the carriage and trip rod for moving the trip rod into circuit-opening position, means carried by the cable for breaking the engagement between said interengaging means on lowering of the carrier to a predetermined level, and spring means tending to return the trip rod into circuit-closing position.

5. A film developing apparatus for use with a plurality of developing solutions, comprising opposed end frames, parallel guide rods extending therebetween, a trip rod slidably mounted in the end frames and including a circuit-breaking element, a carriage slidable on the guide rods, means for adjusting the frictional engagement between the carriage and guide rods, a trip lever pivotally mounted on the carriage, a dog on the trip lever, means tending to urge the dog against the trip rod, the trip rod having a notch intermediate its ends engageable by the dog during movement of the carriage, whereby to move the trip rod out of circuit-closing position, a film carrier dependingly supported by the carriage, an electrically powered winding reel on one of the end frames, a cable connected at its respective ends to the winding reel and film carrier, the cable being extended through the carriage, a cable stop on the cable engageable with the trip lever, whereby to move the dog out of engagement with the notch, and a plurality of timing switch means on one of the end frames, said switch means, power means, and circuit-breaking element being connected in circuit.

6. A film developing apparatus for use with a plurality of developing solutions, comprising end frames, a carriage horizontally movable therebetween, a trip rod movably mounted between the end frames and including a circuit-breaking element, the trip rod being alternatively movable into circuit-closing and opening position, a film carrier dependingly supported by the carriage, a cable hung on the carriage and connected at one end to the carrier, an electrically powered winding reel on one of the end frames connected to the other end of the cable and in circut with the circuit-breaking element, a trip lever on the carriage engageable with the trip rod on movement of the carriage, whereby to move the trip rod into circuit-opening position, means on the cable movable into engagement with the trip lever on downward movement of the carrier, whereby to disengage the trip lever from the trip rod, and means tending to return the trip rod to circuit-closing position.

WILLIAM R. GARDINER.
JOHN T. MAYS.

REFERENCES CITED

The following references are of record in the file of this patent:

UNITED STATES PATENTS

| Number | Name | Date |
|---|---|---|
| 1,254,300 | Baker | Jan. 22, 1918 |